US012724225B2

(12) United States Patent
Yang et al.

(10) Patent No.: US 12,724,225 B2
(45) Date of Patent: Sep. 1, 2026

(54) DISPLAY DEVICE

(71) Applicant: Wuhan China Star Optoelectronics Technology Co., Ltd., Wuhan (CN)

(72) Inventors: Huanli Yang, Wuhan (CN); Guowei Zha, Wuhan (CN); Rui Yang, Wuhan (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 543 days.

(21) Appl. No.: 17/926,201

(22) PCT Filed: Nov. 10, 2022

(86) PCT No.: PCT/CN2022/131229

§ 371 (c)(1),
(2) Date: Nov. 18, 2022

(87) PCT Pub. No.: WO2024/060375

PCT Pub. Date: Mar. 28, 2024

(65) Prior Publication Data

US 2024/0219680 A1 Jul. 4, 2024

(30) Foreign Application Priority Data

Sep. 20, 2022 (CN) ......................... 202211148703.X

(51) Int. Cl.
*G02B 7/06* (2021.01)
*G02B 7/02* (2021.01)
(Continued)

(52) U.S. Cl.
CPC ............... *G02B 7/06* (2013.01); *G02B 7/022* (2013.01); *G02B 27/0172* (2013.01); *G02B 27/0176* (2013.01); *G02B 7/10* (2013.01)

(58) Field of Classification Search
CPC . G02B 7/022; G02B 7/04; G02B 7/06; G02B 23/125; G02B 25/00; G02B 25/001;
(Continued)

(56) References Cited

U.S. PATENT DOCUMENTS

2004/0239685 A1 12/2004 Kiyokawa et al.
2017/0102549 A1* 4/2017 Lee .................... G02B 27/0176
(Continued)

FOREIGN PATENT DOCUMENTS

CN 204028444 12/2014
CN 106019603 A * 10/2016 ......... G02B 27/0176
(Continued)

OTHER PUBLICATIONS

Liu et al. CN214504033U English language translation (Year: 2021).*

(Continued)

*Primary Examiner* — Marin Pichler

(57) ABSTRACT

A display device includes optical machines; each of the optical machines includes a lens assembly and a display assembly; the display assembly includes a display screen; the lens assembly includes: a lens group, a lens barrel with a limiting groove, a focus ring sleeved outside the lens barrel, and a bracket, wherein the lens barrel is sleeved outside the bracket; the bracket includes a convex portion accommodated in the limiting groove and connected to the focus ring; when focusing, the lens group does not move, the focus ring drives the bracket to move linearly, and the bracket drives the display screen moves linearly relative to the lens group.

17 Claims, 7 Drawing Sheets

(51) Int. Cl.
*G02B 7/10* (2021.01)
*G02B 27/01* (2006.01)

(58) Field of Classification Search
CPC .. G02B 25/002; G02B 25/004; G02B 25/005; G02B 25/008; G02B 25/02; G02B 27/017; G02B 27/0172; G02B 27/0176; G02B 27/0178; G02B 2027/0132; G02B 2027/0136; G02B 2027/0161; G06F 1/163; H04N 5/7491; H04N 13/344; H04N 13/332
USPC ........ 359/410, 383, 425, 426, 626, 825, 379
See application file for complete search history.

(56) References Cited

U.S. PATENT DOCUMENTS

2022/0392982 A1 * 12/2022 Yamazaki .......... G02B 27/0172
2024/0069303 A1 * 2/2024 Huang ..................... G02B 7/04

FOREIGN PATENT DOCUMENTS

CN 106773062 5/2017
CN 206147176 5/2017
CN 107728365 2/2018
CN 207232507 4/2018
CN 108469703 8/2018
CN 110133851 8/2019
CN 110646912 1/2020
CN 212111992 12/2020
CN 212111993 12/2020
CN 212569291 U * 2/2021
CN 214504033 10/2021
CN 216118207 3/2022
CN 217386008 9/2022
KR 10-2016-0033926 3/2016
TW M622169 1/2022
WO WO 2018/219237 12/2018

OTHER PUBLICATIONS

Gao et al; CN-106019603-A English language translation with original document.*

Liu et al. CN-212569291-U English language translation (Year: 2021).*

International Search Report and the Written Opinion Dated Jun. 7, 2023 From the International Searching Authority Re. Application No. PCT/CN2022/131229 and Its Translation Into English. (16 Pages).

Notice of Reasons for Refusal Dated Dec. 3, 2024 From the Japan Patent Office Re. Application No. 2022-571882 and Its Translation Into English. (4 Pages).

Request for the Submission of An Opinion Dated Oct. 4, 2024 From the Korean Intellectual Property Office Re. Application No. 10-2022-7042048 and Its Translation Into English. (24 Pages).

Notification of Office Action and Search Report Dated Feb. 27, 2025 From The State Intellectual Property Office of the People's Republic of China Re. Application No. 202211148703.X and Its Translation Into English. (24 Pages).

* cited by examiner

DISPLAY DEVICE

RELATED APPLICATIONS

This application is a National Phase of PCT Patent Application No. PCT/CN2022/131229 having International filing date of Nov. 10, 2022, which claims the benefit of priority of China Patent Application No. 202211148703.X filed on Sep. 20, 2022. The contents of the above applications are all incorporated by reference as if fully set forth herein in their entirety.

BACKGROUND OF INVENTION

Field and Background of the Invention

The present invention relates to the field of display technology, and in particular, to a display device.

With the continuous increase of people's display requirements for consumer electronic products, virtual/augmented reality display technology has attracted more and more people's attention. Virtual Reality (VR) has a better immersive experience and is increasingly favored by consumers. VR equipment generally includes two symmetrically arranged VR light machines. In order to reduce a size of the VR equipment, a display screen of the VR light machine is generally relatively close to a human eye, so it is necessary to set optical elements (such as lenses, etc.) between the display screen and the human eye, a picture of the display screen is refracted or reflected by the optical element to produce a magnified image at a distance, and the human eye views the magnified image to realize immersive vision.

In order to be compatible with users with different eyesight, the position of the display screen is generally fixed, and the focus adjustment (zoom) is realized by adjusting an interval between optical elements or adjusting a distance between the light source element and the display screen. In this way of adjusting a focal length, a position of the optical display element changes, thereby increasing a total optical length of the VR optical machine, which is not conducive to the miniaturization of the VR device.

SUMMARY OF THE INVENTION

Forming a common cathode by evaporation on an entire surface will cause a short-circuit between the common cathode and an anode of a Micro-LED, resulting in device failure.

In view of this, the present invention provides a display device beneficial for miniaturization.

In order to solve the above problems, the technical solutions provided by the present invention are as follows:

A display device includes two optical machines arranged symmetrically;

wherein each of the optical machines includes a lens assembly and a display assembly; and the display assembly includes a display screen;

wherein each of the lens assemblies includes:

a lens group, wherein the display screen faces the lens group;

a lens barrel provided with at least one limiting groove, wherein the lens group is accommodated in the lens barrel;

a focus ring sleeved outside the lens barrel; and a bracket, wherein the lens barrel is sleeved outside the bracket, the bracket includes at least one convex portion, one of the convex portion is accommodated in one of the limiting groove and connected to the focus ring, and the display screen is fixed on the bracket;

wherein, during focusing, the lens group does not move, the focus ring drives the bracket to move linearly relative to the lens group in the lens barrel, and the bracket drives the display screen to move linearly in the lens barrel relative to the lens group.

In an optional embodiment of the present invention, the convex portion has a first external thread, the focus ring has an internal thread, and the first external thread engages with the internal thread.

In an optional embodiment of the present invention, a shape of a section of the display screen facing the lens group is a center-symmetric polygon.

In an optional embodiment of the present invention, the display screen includes an array substrate and a binding terminal electrically connected to the array substrate; the array substrate includes a first surface facing the lens group, a second surface opposite to the first surface, and at least one side surface connecting the first surface and the second surface; and the binding terminal is formed on the side surface or on the second surface.

In an optional embodiment of the present invention, the display assembly further includes a chip-on-film, a driving integrated circuit, and a flexible circuit board; the chip-on-film is electrically connected to the binding terminal and the flexible circuit board; the driving integrated circuit is formed on the chip-on-film; and orthographic projections of the flexible circuit board and the driving integrated circuit on the display screen both fall outside the display screen.

In an optional embodiment of the present invention, a length of the limiting groove is greater than a length of the convex portion, and a length direction of the limiting groove is a moving direction of the display screen; a width of the limiting groove is smaller than a width of the convex portion, and a width direction of the limiting groove is perpendicular to a length of the limiting groove.

In an optional embodiment of the present invention, the bracket has a first opening and a first accommodating groove communicated with the first opening, the display screen is accommodated in the first accommodating groove, and a part of the display screen is exposed from the first opening, the cover plate has a shape of a center-symmetric polygon, a size of the cover plate is larger than a size of the display screen; and the display assembly further includes a cover plate located on a side of the display screen away from the first opening, and the cover plate is fixed on the bracket.

In an optional embodiment of the present invention, the cover plate has a second opening, and a part of the chip-on-film or the flexible circuit board protrudes from the second opening.

In an optional embodiment of the present invention, an outer wall of the bracket is formed with an annular second accommodating groove, a part of the lens barrel is accommodated in the second accommodating groove, and the limiting groove is communicated with the second accommodating groove.

In an optional embodiment of the present invention, the lens assembly further includes a pressure ring, the pressure ring is fixed on an end of the lens barrel away from the display screen, the pressure ring partially covers the lens group and has a light-transmitting hole, and a part of the lens group is exposed from the light-transmitting hole.

In an optional embodiment of the present invention, the display device further includes a support body portion, and the support body portion has a first accommodating groove and a second accommodating groove arranged adjacent to each other, two of the optical machines are respectively accommodated in the first accommodating groove and the second accommodating groove.

In an optional embodiment of the present invention, the display device further includes an interpupillary distance adjusting portion, the interpupillary distance adjusting portion and the optical machine are both arranged on the support body portion, the interpupillary distance adjusting portion is respectively connected to the two optical machines and configured to make the two optical machines move in reverse or opposite linear directions in the first accommodating groove and the second accommodating groove respectively.

In an optional embodiment of the present invention, the lens barrel includes a first limiting portion, and the first limiting portion is close to the display screen and away from the body portion of the bracket; and when the focus ring drives the display screen to be farthest from the lens group, one end of the focus ring abuts on the first limiting portion.

In an optional embodiment of the present invention, the pressure ring includes a second limiting portion, and the second limiting portion faces the focus ring; and when the focus ring drives the display screen to be closest to the lens group, one end of the focus ring abuts on the second limiting portion.

In the display device provided by the present invention, a bracket for supporting the display screen is arranged inside the lens barrel, the bracket includes at least one of the convex portions, and at least one limiting groove is opened in the lens barrel corresponding to the convex portion, and one of the convex portions protrudes from one of the limiting grooves and is connected to the focus ring. During focusing, the lens group does not move, and the focus ring drives the convex portion to move linearly relative to the lens group in the limiting groove, the convex portion drives the bracket to move linearly relative to the lens group in the lens barrel, and the bracket drives the display screen to move linearly relative to the lens group in the lens barrel. As such, the bracket drives the display screen to move linearly in the lens barrel without increasing the size of the lens assembly (especially the lens barrel) of the optical machine, which is beneficial to the miniaturization of the display device.

BRIEF DESCRIPTION OF THE SEVERAL VIEWS OF THE DRAWINGS

In order to more clearly illustrate the technical solutions of the embodiments of the application, the drawings illustrating the embodiments will be briefly described below. Obviously, the drawings in the following description merely illustrate some embodiments of the present invention. Other drawings may also be obtained by those skilled in the art according to these figures without paying creative work.

DETAILED DESCRIPTION OF SPECIFIC EMBODIMENTS OF THE INVENTION

Figure 1:
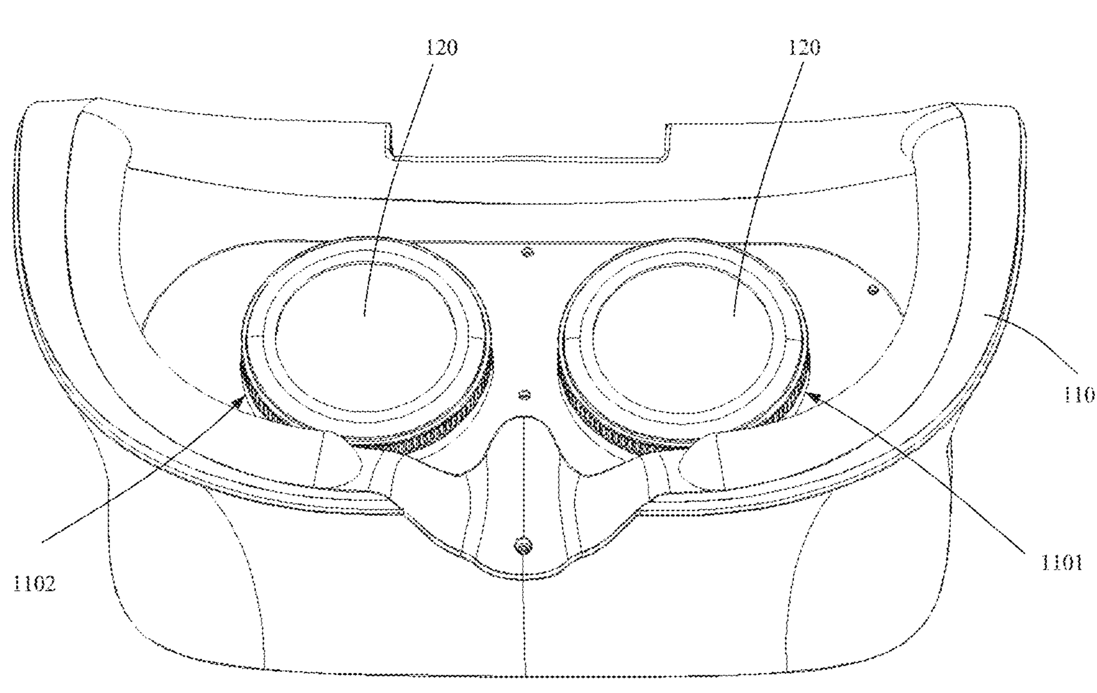
FIG. 1 is a schematic perspective view of a display device according to a first embodiment of the present invention.

Referring to the figures in the drawings, in which, like numbers refer to like elements throughout the description of the figures. Hereinafter, the present invention will be described in further detail with reference to examples. It is to be understood, however, that these examples are for illustrative purposes only and are not intended to limit the scope of the present invention.

In the description of the present disclosure, it should be understood that the orientation or positional relationship indicated by the terms “upper”, “lower” etc. are based on the orientation or positional relationship shown in the drawings, and the above orientation or positional relationship is only for the convenience of describing the present invention and simplifying the description, rather than indicating or implying that the device or element referred to must have a specific orientation, be constructed and operated in a specific orientation. Therefore, it cannot be understood as a limitation of the present disclosure. In addition, the terms “first” and “second” are used for descriptive purposes only, and cannot be understood as indicating or implying relative importance or implicitly indicating the number of technical features indicated. Therefore, the features defined as “first” and “second” may explicitly or implicitly include one or more of the features. In the description of the present application, the meaning of “a plurality” is two or more, unless specifically defined otherwise.

In the present invention, reference numerals and/or reference letters may be repeated in different implementations, such repetition is for the purpose of simplicity and clarity and does not in itself dictate the relationship between the various implementations and/or arrangements discussed.

The display device provided by the present invention will be described in detail below with reference to specific embodiments and accompanying drawings.

Referring to FIG. 1, a preferred embodiment of the present invention provides a display device 100, the display device 100 includes a support body portion 110, two symmetrically arranged optical machines 120, and an interpupillary distance adjusting portion (not shown). Both the interpupillary distance adjusting portion and the optical machine 120 are arranged on the support body portion 110. Specifically, the support body portion 110 has a first accommodating groove 1101 and a second accommodating groove 1102 arranged adjacent to each other, two of the optical machines 120 are respectively accommodated in the first accommodating groove 1101 and the second accommodating groove 1102. In the second accommodating groove 1102, the interpupillary distance adjusting portion is respectively connected to the two optical machines 120 and configured to make the two optical machines 120 move in reverse or opposite linear directions in the first accommodating groove 1101 and the second accommodating groove 1102, respectively.

Figure 2:
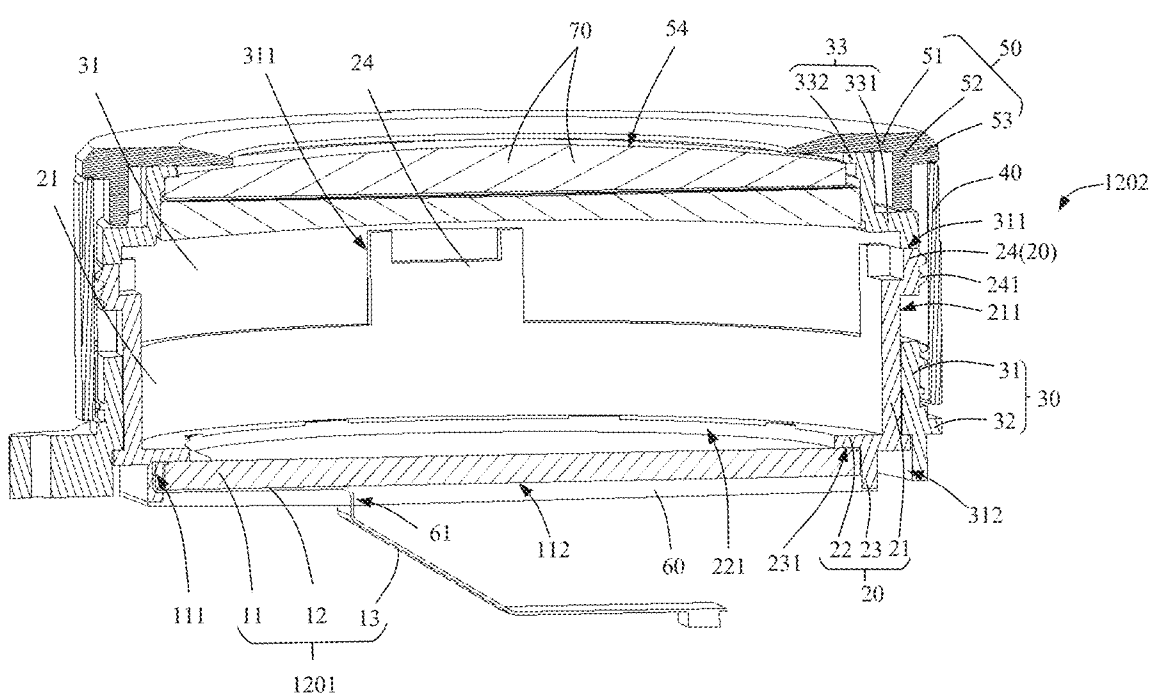
FIG. 2 is a cross-sectional view of an optical machine of the display device shown in FIG. 1.

Specifically, referring to FIG. 2, each of the optical machines 120 includes a display assembly 1201 and a lens assembly 1202, and the display assembly 1201 is fixed in the lens assembly 1202.

Specifically, referring to FIGS. 2-11, the display assembly 1201 includes a display screen 11, a chip-on-film 12, a flexible circuit board 13, and a driving integrated circuit 14. The flexible circuit board 13 is electrically connected to the display screen 11 through the chip-on-film 12, and the driving integrated circuit 14 is formed on the chip-on-film 12 and is electrically connected to the chip-on-film 12. The display screen 11 further includes an array substrate 103, a color filter substrate 104, and a liquid crystal (not shown). The array substrate 103 is disposed opposite to the color filter substrate 104, and the liquid crystal is located between the array substrate 103 and the color filter substrate 104. The array substrate 103 includes a first surface 113 facing the color filter substrate 104, a second surface 114 opposite to the first surface 113, and at least one side surface 111 connecting the first surface 113 and the second surface 114. The color filter substrate 104 faces the first surface 113, wherein the display screen 11 further includes a binding terminal 112, the binding terminal 112 is formed on the side surface 111 or the second surface 114 of the array substrate 103 and is electrically connected to the array substrate 103, and the chip-on-film 12 is electrically connected to the binding terminal 112 and the flexible circuit board 13.

Orthographic projections of the flexible circuit board 13 and the driving integrated circuit 14 on the display screen 11 both fall on the display screen 11 or fall outside the display screen 11.

The display screen 11 further includes a backplane 105 formed on the surface of the array substrate 103 away from the color filter substrate 104.

Figure 3:
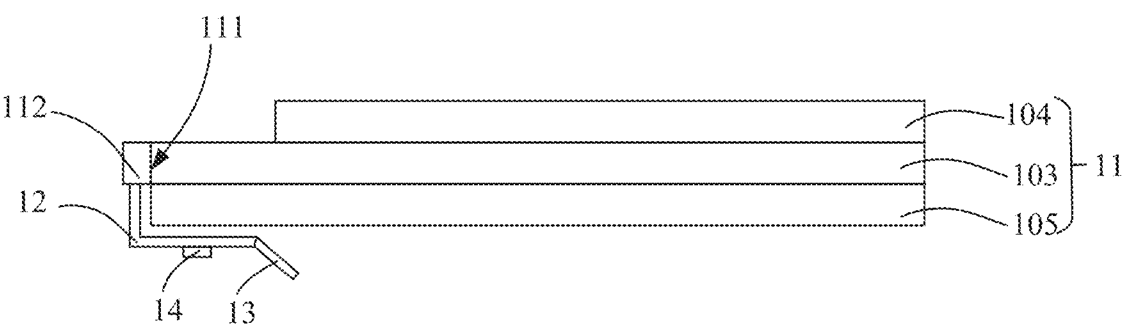
FIG. 3 is a cross-sectional view of a first display assembly of the optical machine shown in FIG. 2.

Specifically, referring to FIG. 3, in an optional embodiment of the present invention, the binding terminal 112 is formed on the side surface 111 of the array substrate 103. One end of part of the chip-on-film 12 is electrically connected to the binding terminal 112, and the other end is bent and extended to the side of the display screen 11 away from the color filter substrate 104. Specifically, part of the orthographic projection of the chip-on-film 12 on the display screen 11 falls on the surface of the backplane 105 away from the array substrate 103, the orthographic projections of the driving integrated circuit 14 and the flexible circuit board 13 on the display screen 11 all fall on the surface of the backplane 105 away from the array substrate 103.

Figure 4:
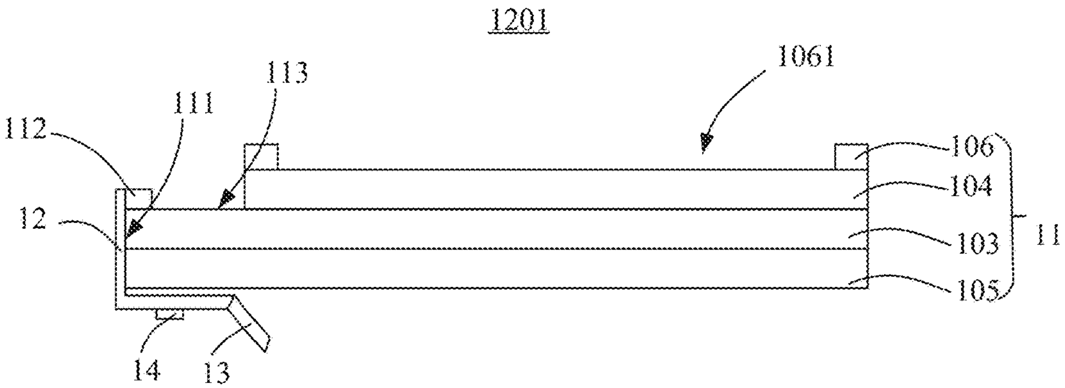
FIG. 4 is a cross-sectional view of a second display assembly of the optical machine shown in FIG. 2.

Specifically, referring to FIG. 4, in another optional embodiment of the present invention, the binding terminal 112 is formed on the first surface 113 of the array substrate 103 and is located at one end of the color filter substrate 104. One end of part of the chip-on-film 12 is electrically connected to the binding terminal 112, and the other end is bent and extended to the side of the display screen 11 away from the color filter substrate 104. Specifically, part of the orthographic projection of the chip-on-film 12 on the display screen 11 falls on the surface of the backplane 105 away from the array substrate 103, the orthographic projections of the driving integrated circuit 14 and the flexible circuit board 13 on the display screen 11 all fall on the surface of the backplane 105 away from the array substrate 103. In addition, the display screen 11 may further include a light-shielding layer 106 formed on the surface of the color filter substrate 104 away from the array substrate 103, and the light-shielding layer 106 has a third opening 1061, part of the color filter substrate 104 is exposed from the third opening 1061.

Figure 5:
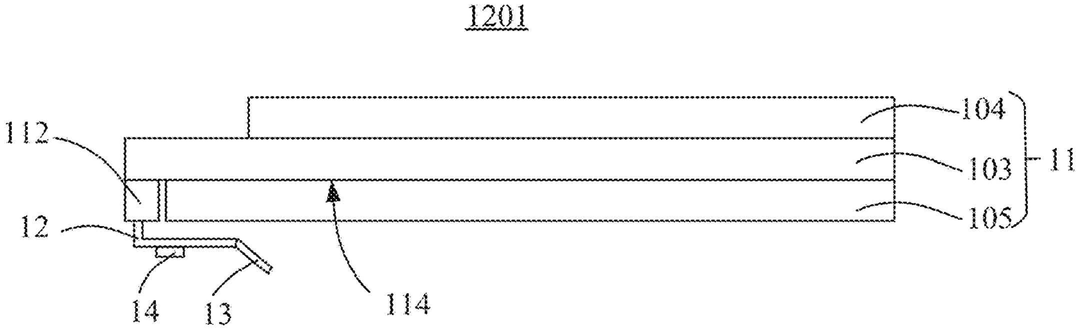
FIG. 5 is a cross-sectional view of a third display assembly of the optical machine shown in FIG. 2.

Specifically, referring to FIG. 5, in yet another optional embodiment of the present invention, the binding terminal 112 is formed on the second surface 114 of the array substrate 103 and is located at one end of the backplane 105. One end of part of the chip-on-film 12 is electrically connected to the binding terminal 112, and the other end is bent and extended to the side of the display screen 11 away from the color filter substrate 104. Specifically, part of the orthographic projection of the chip-on-film 12 on the display screen 11 falls on the surface of the backplane 105 away from the array substrate 103, the orthographic projections of the driving integrated circuit 14 and the flexible circuit board 13 on the display screen 11 all fall on the surface of the backplane 105 away from the array substrate 103.

Figure 6:
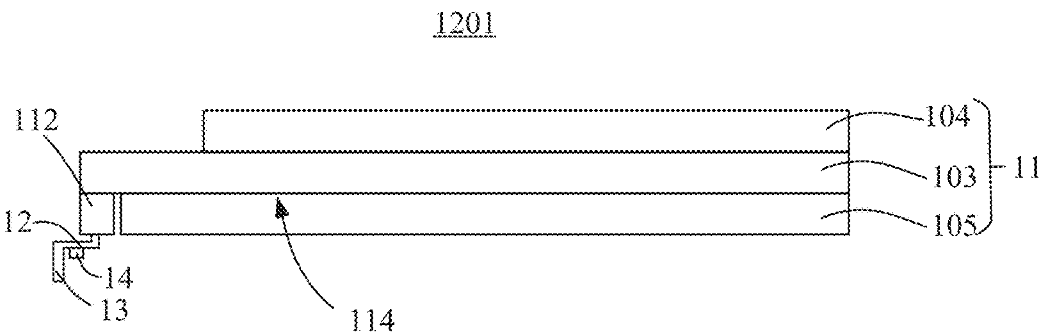
FIG. 6 is a cross-sectional view of a fourth display assembly of the optical machine shown in FIG. 2.

Specifically, referring to FIG. 6, in yet another optional embodiment of the present invention, the binding terminal 112 is formed on the second surface 114 of the array substrate 103 and is located at one end of the backplane 105. One end of part of the chip-on-film 12 is electrically connected to the binding terminal 112, and the other end is bent and extended in a direction away from the backplane 105. Specifically, part of the orthographic projection of the chip-on-film 12 on the display screen 11 falls outside the display screen 11, and the orthographic projections of the driving integrated circuit 14 and the flexible circuit board 13 are on the display screen 11 all fall outside the display screen 11.

Figure 7:
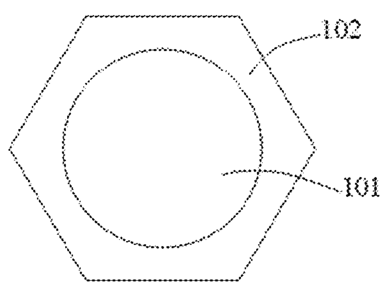
FIG. 7 is a top view of a display screen of the optical machine shown in FIG. 2.
Figure 8:
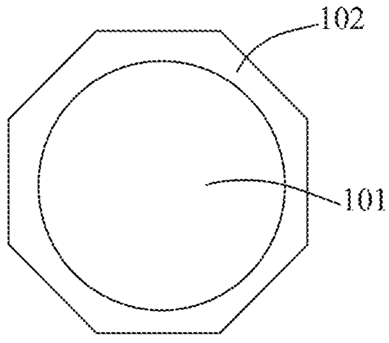
FIG. 8 is a top view of another display screen of the optical machine shown in FIG. 2.

Referring to FIG. 7 and FIG. 8, a shape of a cross-section of the display screen 11 is a center-symmetric polygon in a direction perpendicular to a stacking direction of the array substrate 103 and the color filter substrate 104, that is, a shape of the projection of the display screen 11 on the bracket 20 (see below) is a centrosymmetric polygon, such as a hexagon, an octagon, a dodecagon, etc. Specifically, the display screen 11 includes a display area 101 and a non-display area 102 surrounding the display area 101. A shape of the display area 101 is generally circular, and edges of the non-display area 102 away from the display area 101 are center-symmetric polygons such as hexagons, octagons, and dodecagons. Since a field of view of the optical machine 120 is circular, the effective utilization area (display area) of the display screen is correspondingly circular, and by designing the appearance of the display screen 11 as a center-symmetric polygon (such as a hexagon or an octagon, etc.), the size of the display screen can be reduced. Further, due to the reduction in the size of the display screen, by designing the appearance of the display screen 11 as a center-symmetric polygon (such as a hexagon or an octagon, etc.), the display screen can also be maximized.

Still referring to FIGS. 2 and 9-12, each of the lens assemblies 1202 includes a bracket 20, a lens barrel 30, a focus ring 40, a pressure ring 50, a cover plate 60, and a lens group 70. The focus adjustment The ring 40 is sleeved outside the lens barrel 30, the lens barrel 30 is sleeved outside the bracket 20, the pressure ring 50 is fixed on one end of the lens barrel 30, and the lens group 70 is fixed on one end of the lens barrel 30 close to the pressure ring 50, the cover plate 60 is fixed on one end of the bracket 20 away from the lens group 70, and the display screen 11 is placed on one end of the bracket 20 away from the lens group 70 and is fixed between the cover plate 60 and the bracket 20 by the cover plate 60.

The bracket 20 includes a bracket body portion 21, a first support portion 22, a second support portion 23, and a plurality of convex portions 24. The first support portion 22 and the second support portion 23 constitute a support member. The bracket body portion 21 is annular, the first support portion 22 is in the shape of a hollow sheet, the first support portion 22 is fixed on one end of the bracket body portion 21, and the second support portion 23 is fixed on the surface of the first support portion 22 away from the bracket body portion 21, the first support portion 22 has a first opening 221, and a first accommodating groove 231 communicated with the first opening 221 is enclosed between the first support portion 22 and the second support portion 23, and the display screen 11 is accommodated in the first accommodating groove 231. Part of the display screen 11 is exposed from the first opening 221. The cover plate 60 is located on the side of the display screen 11 away from the first opening 221 and is fixed on the second support portion 23 to fix the display screen 11 in the first accommodating groove 231.

Figure 9:
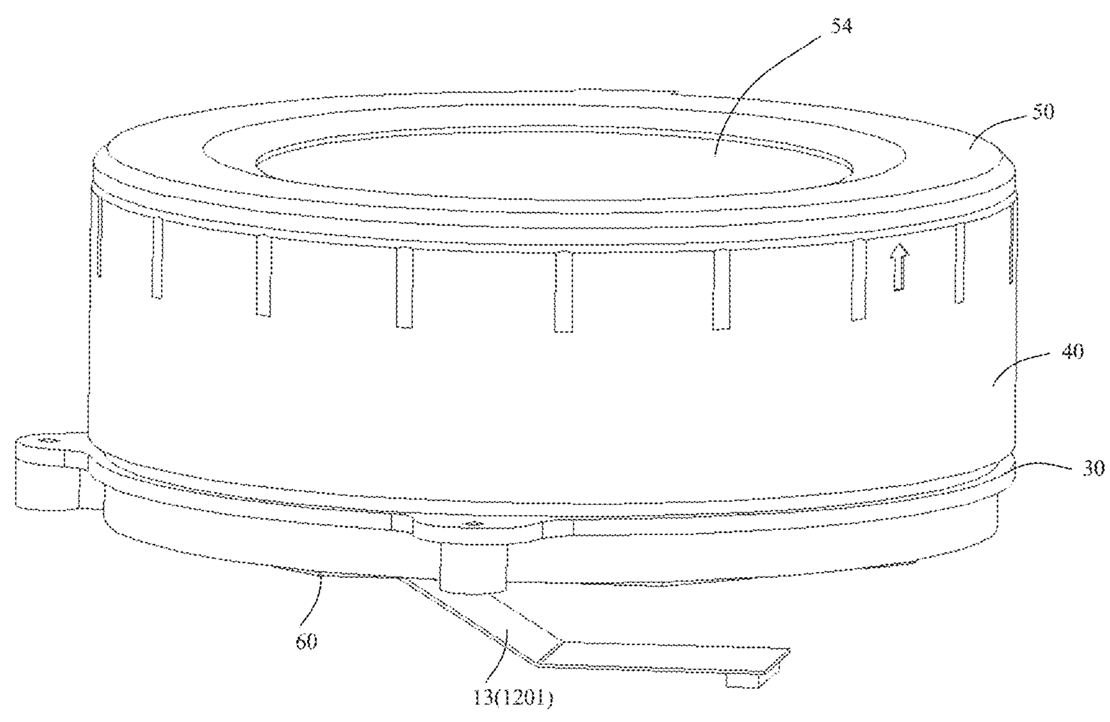
FIG. 9 is a schematic perspective view of the optical machine shown in FIG. 2.

Specifically, referring to FIG. 9, in this embodiment, the shape of the cover plate 60 is also a center-symmetrical polygon, and the size of the cover plate 60 is larger than the size of the display screen 11.

One end of the first support portion 22 away from the first opening 221 protrudes out of the bracket body portion 21, the protruding portion 24 is fixed on one end of the bracket body portion 21 away from the first support portion 22 and is formed on the outer wall of the bracket body 21 facing the focus ring 40, the convex portion 24 and the part of the first supporting part 22 protruding from the bracket body 21 are formed into an annular second accommodating groove 211, and part of the lens barrel 30 is accommodated in the second accommodating groove 211.

A first external thread 241 is formed on the outer wall of the convex portion 24 facing the focus ring 40.

The lens barrel 30 includes a lens barrel body portion 31, a first limiting portion 32 and a stepped portion 33, the stepped portion 33 and the first limiting portion 32 are respectively fixed on opposite ends of the lens barrel body portion 31, the stepped portion 33 is close to the lens group 70, the first limiting portion 32 is close to the display screen 11 and away from the bracket body 21, and the focus ring 40 is sleeved outside the lens barrel body portion 31 and can move linearly along the extending direction of the lens barrel body portion 31, and a moving range of the focus ring 40 is limited by the first limiting portion 32 and the pressure ring 50.

The lens barrel body 31 is opened with at least one limiting groove 311, and one of the convex portions 24 is accommodated in one of the limiting grooves 311 and is connected to the focus ring 40. The focus ring 40 can drive the bracket 20 to move linearly in the lens barrel 30, and the bracket 20 can drive the display screen 11 to move linearly in the lens barrel 30. A length of the limiting groove 311 is greater than the length of the protruding portion 24 to fit the focus ring 40 and drive and guide the protruding portion 24 to move along a length direction of the limiting groove 311 in the limiting groove under the driving of the focus ring 40. A width of the limiting groove 311 is smaller than a width of the protruding portion 24 to limit rotation between the bracket 20 and the lens barrel 30. A length direction of the limiting groove 311 is the moving direction of the display screen 11, and a width direction of the limiting groove 311 is perpendicular to the length of the limiting groove 311.

A third accommodating groove 312 is defined on the body portion 31 of the lens barrel, the first supporting portion 22 is received in the third accommodating groove 312, and the third accommodating groove 312 is also used to limit the movement range of the display screen 11 in the lens barrel 30.

The stepped portion 33 includes a first stepped sub-portion 331 and a second stepped sub-portion 332. The second stepped sub-portion 332 is vertically and fixedly connected to the first stepped sub-portion 331. The first stepped sub-portion 331 is vertically and fixedly connected to the end of the lens barrel body portion 31 away from the display screen 11. The lens group 70 is accommodated in a cavity formed by the second step sub-portion 332 and fixed on an inner wall of the second step sub-portion 332.

Figure 10:
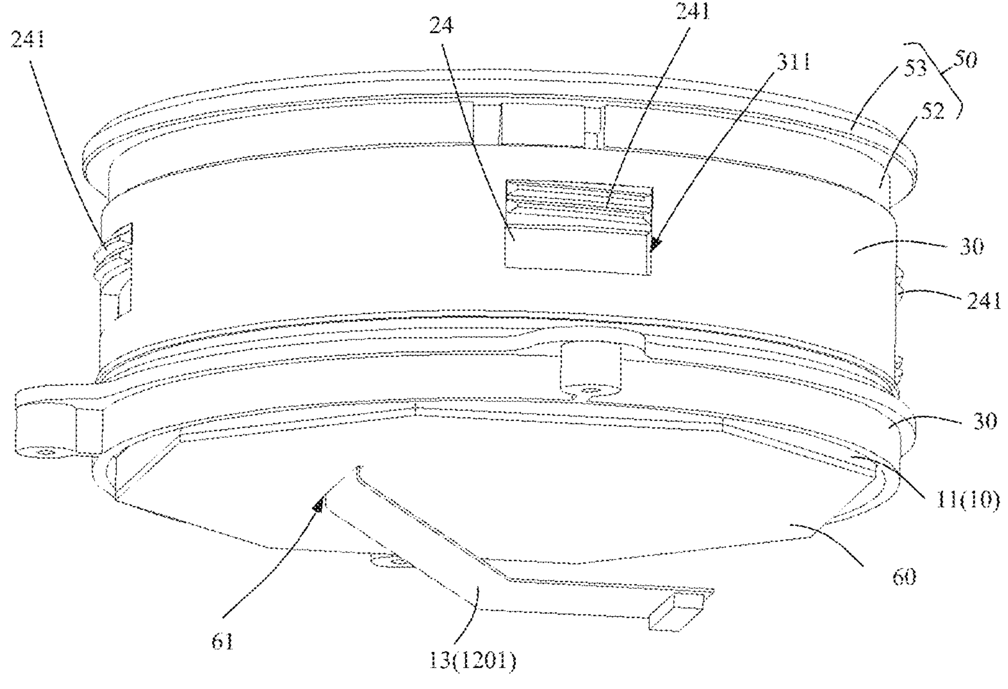
FIG. 10 is a schematic perspective view of the optical machine after removing a focus ring shown in FIG. 3.
Figure 11:
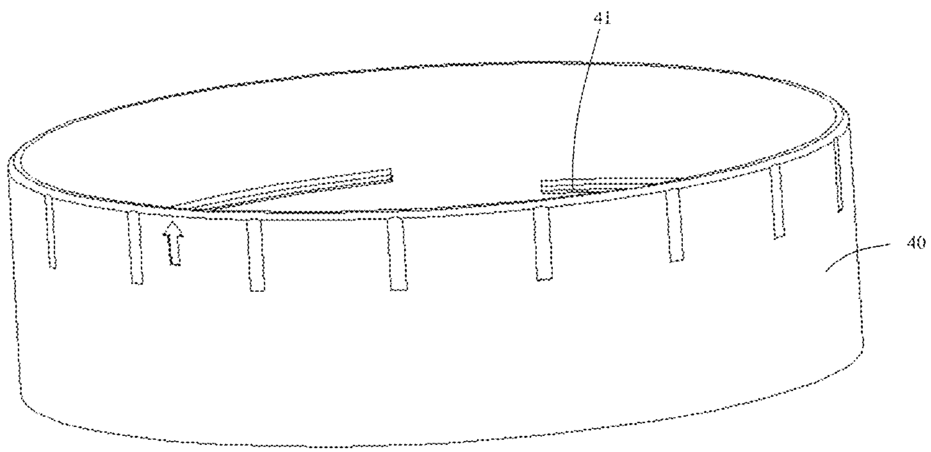
FIG. 11 is a schematic perspective view of the focus ring of the optical machine shown in FIG. 3.

Specifically, referring to FIG. 2 and FIG. 10, an inner wall of the focus ring 40 facing the lens barrel 30 has an inner thread 41, and the first outer thread 241 is engaged with the inner thread 41. In this way, when the focus ring 40 is rotated, the focus ring 40 drives the convex portion 24 to move linearly in the limiting groove 311, the convex portion 24 drives the bracket 20 to move linearly in the lens barrel 30, and the bracket 20 drives the display screen 11 to move linearly in the lens barrel 30. The limiting groove 311 is used to limit a linear movement distance of the display screen 11 in the lens barrel 30, that is, the limiting groove 311 is used to limit a focus adjustment range of the optical machine 120.

The pressure ring 50 is fixed on the end of the lens barrel 30 away from the display screen 11. The pressure ring 50 includes a pressure ring body portion 51, an abut portion 52 and a second limiting portion 53, the abut portion 52 is fixed on the first step sub-portion 331, and the abut portion 52 has a ring shape. The pressure ring body portion 51 and the second limiting portion 53 are respectively fixed to one end of the abut portion 52 away from the first step sub-portion 331. The body portion 51 of the pressure ring partially covers the lens group 70, the body portion 51 of the pressure ring has a light-transmitting hole 54, and part of the lens group 70 is exposed from the light-transmitting hole 54. The second limiting portion 53 faces the focus ring 40. When the focus ring 40 drives the display screen 11 to be closest to the lens group 70, one end of the focus ring 40 abuts on the focus ring 40. On the second limiting portion 53, when the focus ring 40 drives the display screen 11 to be farthest from the lens group 70, one end of the focus ring 40 abuts on the first limiting portion 32.

The cover plate 60 further has a second opening 61, and part of the chip-on-film 12 or the flexible circuit board 13 protrudes from the second opening 61.

The lens group 70 includes at least one lens, and the lens is fixed on the inner wall of the second step sub-portion 332 of the lens barrel 30 away from the focus ring 40. The display screen 11 faces the lens group 70, and specifically, the color filter substrate 104 faces the lens group 70.

Figure 12:
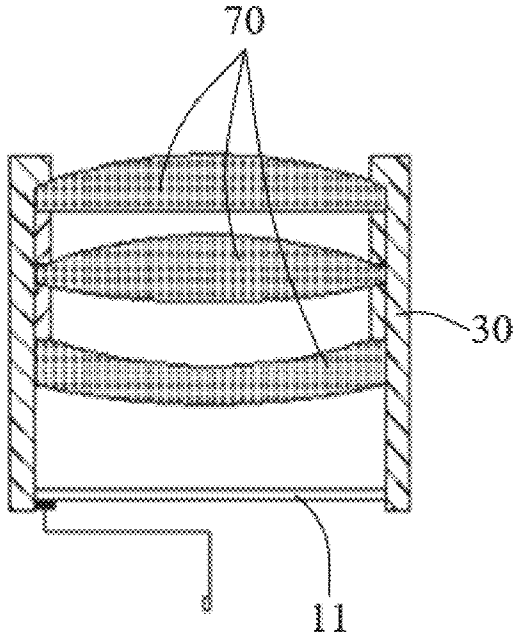
FIG. 12 and FIG. 13 are relative positional relationship of the display screen in the optical machine shown in FIG. 2 when viewing angles are 0 D and −8 D, respectively.

Referring to FIG. 12, when a viewing angle of the optical machine 120 is 0 D, the display screen 11 is far away from the lens group 70.

Figure 13:
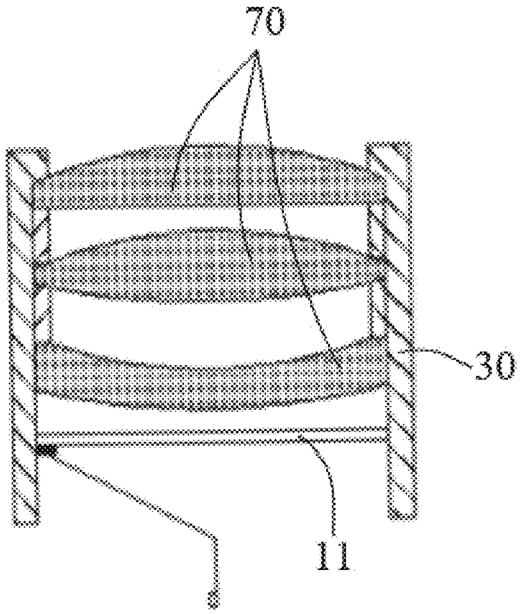

Referring to FIG. 13, when the viewing angle of the optical machine 120 is not 0 D (eg, −5 D or −8 D, etc.), the display screen 11 is close to the lens group 70.

In the display device provided by the present invention, a bracket for supporting the display screen is arranged inside the lens barrel, the bracket includes at least one of the convex portions, at least one limiting groove is opened in the lens barrel corresponding to the convex portion, and one of the convex portions protrudes from one of the limiting grooves and is connected to the focus ring. During focusing, the lens group does not move, and the focus ring drives the convex portion move linearly relative to the limiting groove in the limiting groove. The lens group moves in a straight line, the convex portion drives the bracket to move linearly relative to the lens group in the lens barrel, and the bracket drives the display screen to move linearly relative to the lens in the lens barrel. As such, the bracket drives the display screen to move linearly in the lens barrel, without increasing the size of the lens assembly (especially the lens barrel) of the optical machine, which can not only achieve the purpose of focusing, but also facilitate the miniaturization of the display device.

In addition, since a field of view of the optical machine 120 is circular, the effective utilization area (display area) of the display screen is correspondingly circular, and by designing the appearance of the display screen as a center-symmetric polygon (such as a hexagon or an octagon, etc.), the size of the display screen can be reduced. Further, due to the reduction in the size of the display screen, by designing the appearance of the display screen as a center-symmetric polygon (such as a hexagon or an octagon, etc.), the display screen can be maximized.

In addition, forming the chip-on-film and the driver integrated circuit on the side or back of the display screen (array substrate) can reduce a border width of the display device, thereby increasing a screen-to-body ratio, thereby reducing the size of the display assembly, which is conducive to miniaturization of the display device.

In addition, through the cooperation of the bracket, the lens barrel, and the focus ring in the present application, a focus structure can be simplified, the display screen can be more easily fixed and moved, the service life of the flexible circuit board of the display assembly can be improved, and the abnormal sound generated when adjusting the focal length and interpupillary distance can be reduced.

In addition, in the present invention, compared with a focusing method by moving the lens group in the prior art, a focusing method by moving the display screen of the present invention can not only ensure that the field of view of the optical machine remains unchanged, but also reduce the overall optical length of the optical machine by 10%-15%.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display device, comprising two optical machines arranged symmetrically; wherein each of the optical machines comprises a lens assembly and a display assembly; and the display assembly comprises a display screen;

wherein the lens assembly comprises:

a lens group, wherein the display screen faces the lens group;

a lens barrel provided with at least one limiting groove, wherein the lens group is accommodated in the lens barrel;

a focus ring independent from and sleeved outside the lens barrel; and a bracket, wherein the lens barrel is sleeved outside the bracket, the bracket comprises at least one convex portion, one of the convex portion is accommodated in one of the limiting groove and connected to the focus ring, and the display screen is fixed on the bracket;

wherein, during focusing, the lens group does not move relative to the lens barrel, the focus ring drives the convex portion to move linearly in the limiting groove along a length direction of the limiting groove, thereby driving the bracket to move linearly close to or away from the lens group in the lens barrel, and the bracket drives the display screen to move linearly in the lens barrel close to or away from the lens group, wherein the convex portion has a first external thread, the focus ring has an internal thread, and the first external thread engages with the internal thread, wherein the lens assembly further comprises a pressure ring, the pressure ring is fixed on an end of the lens barrel away from the display screen, the pressure ring partially covers the lens group and has a light-transmitting hole, and a part of the lens group is exposed from the light-transmitting hole, and wherein the lens barrel comprises a lens barrel body portion, a first limiting portion, and a stepped portion, the stepped portion and the first limiting portion are respectively fixed on opposite ends of the lens barrel body portion, the stepped portion is closer to the lens group than the first limiting portion, the first limiting portion is closer to the display screen than the stepped portion and away from the bracket body, and the focus ring is sleeved outside the lens barrel body portion and is configured to move linearly along an extending direction of the lens barrel body portion, and a moving range of the focus ring is limited by the first limiting portion and the pressure ring.

2. The display device according to claim 1, wherein a shape of a section of the display screen facing the lens group is a center-symmetric polygon.

3. The display device according to claim 1, wherein the display screen comprises an array substrate and a binding terminal electrically connected to the array substrate; the array substrate comprises a first surface facing the lens group, a second surface opposite to the first surface, and at least one side surface connecting the first surface and the second surface; and the binding terminal is formed on the side surface or on the second surface.

4. The display device according to claim 3, wherein the display assembly further comprises a chip-on-film, a driving integrated circuit, and a flexible circuit board; the chip-on-film is electrically connected to the binding terminal and the flexible circuit board; and the driving integrated circuit is formed on the chip-on-film.

5. The display device according to claim 4, wherein orthographic projections of the flexible circuit board and the driving integrated circuit on the display screen both fall on the display screen.

6. The display device according to claim 4, wherein orthographic projections of the flexible circuit board and the driving integrated circuit on the display screen both fall outside the display screen.

7. The display device according to claim 4, wherein the bracket has a first opening and a first accommodating groove communicated with the first opening, the display screen is accommodated in the first accommodating groove, and a part of the display screen is exposed from the first opening.

8. The display device according to claim 7, wherein the display assembly further comprises a cover plate located on a side of the display screen away from the first opening, and the cover plate is fixed on the bracket.

9. The display device according to claim 8, wherein a size of the cover plate is larger than a size of the display screen.

10. The display device according to claim 8, wherein the cover plate has a shape of a center-symmetric polygon.

11. The display device according to claim 8, wherein the cover plate has a second opening, and a part of the chip-on-film or the flexible circuit board protrudes from the second opening.

12. The display device according to claim 1, wherein a length of the limiting groove is greater than a length of the convex portion, and a length direction of the limiting groove is a moving direction of the display screen.

13. The display device according to claim 12, wherein a width of the limiting groove is smaller than a width of the convex portion, and a width direction of the limiting groove is perpendicular to a length of the limiting groove.

14. The display device according to claim 1, wherein an outer wall of the bracket is formed with an annular second accommodating groove, a part of the lens barrel is accommodated in the second accommodating groove, and the limiting groove is communicated with the second accommodating groove.

15. The display device according to claim 1, wherein the display device further comprises a support body portion, and the support body portion has a first accommodating groove and a second accommodating groove arranged adjacent to each other, two of the optical machines are respectively accommodated in the first accommodating groove and the second accommodating groove.

16. The display device according to claim 1, wherein the lens barrel comprises a first limiting portion, and the first limiting portion is close to the display screen and away from the body portion of the bracket; and when the focus ring drives the display screen to be farthest from the lens group, one end of the focus ring abuts on the first limiting portion.

17. The display device according to claim 16, wherein the pressure ring comprises a second limiting portion, and the second limiting portion faces the focus ring; and when the focus ring drives the display screen to be closest to the lens group, one end of the focus ring abuts on the second limiting portion.

* * * * *